Feb. 24, 1970  C. BERGER  3,497,394
INORGANIC PERMSELECTIVE MEMBRANES AND METHOD OF MAKING SAME
Filed Nov. 29, 1963

INVENTOR.
CARL BERGER
BY Fulwider, Patton, Rieber,
Lee, and Utecht
ATTORNEYS

United States Patent Office 3,497,394
Patented Feb. 24, 1970

3,497,394
INORGANIC PERMSELECTIVE MEMBRANES AND METHOD OF MAKING SAME
Carl Berger, Corona Del Mar, Calif., assignor, by mesne assignments, to McDonnell Douglas Corporation, Santa Monica, Calif., a corporation of Maryland
Filed Nov. 29, 1963, Ser. No. 326,740
Int. Cl. H01m 11/00; B01d 13/02, 13/04
U.S. Cl. 136—153      16 Claims My invention relates to the preparation of ion exchange, permselective membranes and, more particularly, to methods of manufacturing high strength permselective membranes incorporating inorganic ion exchange materials.

Ion exchage is generally defined as the reversible exchange of ions between a liquid phase and a solid phase unaccompanied by any radical change in the solid structure. The solid structure is the ion exchanger and may be pictured as a network, lattice, or matrix incorporating fixed charge sites each electrically balanced by a counter-ion of the opposite charge. The counter-ions are readily exchanged for mobile ions of a similar charge type existing in a solution surrounding and permeating the ion exchanger. When the counter-ions are negatively charged the ion exchanger functions as an anion exchanger. When the counter-ions are positively charged, the ion exchanger functions as a cation exchanger.

Because of their ion selective characteristics, ion exchangers find extensive use in industrial processes for demineralizing water and other solvents of soluble ionic contaminants. In such processes, the ion exchangers generally take the forms of organic ion exchange or permselective membranes which by proper choice of organic materials are either cation or anion selective.

In use, the cation and anion selective organic membranes are alternately supported in vertical planes between a pair of plate electrodes to form an electrodialysis cell. The solution being demineralized is passed downward between the membranes and subjected to a transverse electric field extending between the electrodes. Under the influence of the electric field and the permselectivity of the organic membranes, ions of positive and negative charge type in the solution migrate through different membranes to form columns of dilute and concentrated aqueous solution which may be separately combined. Thus the electrodialysis cell employing organic membranes ideally operates to produce a rapid demineralization of the contaminted solution on a continuous basis.

In practice however, organic permselective membranes are subject to a number of critical limitations which result in a radical departure from the foregoing ideal operation of the electrodialysis cell. For example, organic membranes become fouled or plugged after relatively short periods of use. Being composed of organic materials, the membranes are also susceptible to attack by bacteria in solution. Further, organic permselective membranes lack the ability to selectively transport specific ions and tend to break down at elevated temperatures approaching and above 100° C.

The foregoing problems of organic membranes may be alleviated, to some extent, by inorganic ion exchangers. Until recently however, it has not been possible to form inorganic permselective membranes suitable for electrodialysis purposes. For this reason, inorganic ion exchangers have been utilized almost exclusively in particulate form. Even then their use has been primarily limited to column demineralization of soluble ionic contaminants wherein specific ions are absorbed by the particulate ion exchangers and then eluted by suitable solutions. Because such batch demineralization techniques are laborious and expensive, particulate inorganic ion exchangers have found only limited use in the demineralization and purification of water and other solutions.

Recently, however, various methods have been discovered for forming inorganic permselective membranes of insoluble hydrous metal oxides and the acid salt thereof. The methods for forming such inorganic membranes are the subject matter of my co-pending patent application entitled, Preparation of Hydrous Metal Oxide Membanes and Acid Salts Thereof, inventors, Carl Berger and Frank C. Arrance, Ser. No. 326,709, filed of even date herewith. Inorganic permselective membranes formed in accordance with the methods of my co-pending patent application possess the distinct advantages of being substantially free from fouling or plugging, highly selective of specific ions, free from attack by a bacteria, substantially unaffected by high temperatures, and relatively inexpensive to produce. Therefore the inorganic membranes are ideally suited for use in electrodialysis cells for demineralizing water and other solvents of soluble ionic contaminants.

In some electrodialysis applications however, and particularly in fuel cells and batteries wherein inorganic membranes may be utilized as permselective separators, membranes having higher strength characteristics than those presently produceable by the methods of my aforesaid copending patent application are required.

In view of the foregoing, it is an object of my present invention to provide an extremely high strength permselective membrane incorporating insoluble hydrous metal oxides or acid salts.

It is another object of my invention to provide a novel method for making extremely strong permselective membranes incorporating a wide variety of insoluble hydrous metal oxides and acid salts.

It is still another object of my invention to provide a simple method for making sturdy, long-lasting, permselective membranes incorporating insoluble hydrous metal oxides and acid salts which can be employed at temperatures of 125° C., or higher, without degradation.

These and other objects of my present invention will become clear by referring to the following detailed description and the drawing, the single figure of which is a magnified diagrammatic representation of the cross section of the membrane of my invention.

In general, I have found that by filling the pores of a strong, rigid, porous, thin, plate or supportive member or matrix with a gel of an insoluble hydrous metal oxide or acid salt, I produce a membrane having substantially the initial strength of the supportive member and the permselectivity of the inorganic ion exchange material. The permselective membrane thus formed is particularly adapted for use in fuel cells and batteries where an extremely strong ion selective membrane is required to maintain ion separation between the electrodes of the battery or fuel cell and wherein operating temperatures may approach and exceed 125° C.

The actual method of formation as well as chemical composition of the supportive member forms no part of my invention and may comprise any strong, substantially insoluble, material capable of formation into a relatively thin plate having an inner structure of interconnecting pores between opposing surfaces. For example, the supportive member may be a strong porous plastic or a porous ceramic formed by any one of the well-established ceramic techniques such as flame-spraying, powder-pressing and sintering, or slip casting.

For the purposes of my invention, the term "insoluble hydrous metal oxides" includes those water-insoluble solids containing one or more metal atoms, oxygen atoms, and an indeterminate quantity of water. The hydrous metal oxides do not necessarily have a definite stoichiometric combination or definite crystal structure and may contain ionic impurities. The water insoluble hydrous metal oxides with which my invention is primarily concerned are the water insoluble hydrous oxides of metals selected from the following groups of elements in the periodic table: III–A, III–B, IV–A, IV–B, V–A, V–B, VI–B, VII–B, VIII, the Lanthanide Series and the Actinide Series. The metals forming insoluble hydrous metal oxides, which are of the greatest practical importance at the present time are: Al (III), Ga (III), In (III), Sc (III), Y (III), Zr (IV), Ti (IV), Hf (IV), Pb (II), Si (IV), Ge (IV), Sn (IV), Sb (III, V), Bi (III), As (V), V (V), Nb (V), Ta (V), Cr (III), Mo (IV, VI), W (IV, VI), Mn (IV), Re (IV), Tc (IV), Fe (III), Co (II), Ni (II), Ac (III), Th (III), U (IV, VI), Pu (IV), La (III), Ce (IV), and Yb (III).

The term "acid salts" includes water insoluble acid addition products of a hydrous metal oxide or a soluble salt of the metal cation and an acid or a salt of the acid. Preferably, the acids are multivalent oxy-acids, and these acids and salts thereof include an oxygenated anion having a metal selected from the group consisting of P, Si, Ta, Sb, W, B, Nb, As, S, Se, Te, Po, V and Mo., e.g., phosphoric acid, molybdic acid, or sodium tungstate.

By the term "filling," I intend to encompass the pressing or sucking of an inorganic ion exchange hydrous metal oxide or acid salt gel into the pores of the supportive member as well as the chemical precipitation of the ion exchange gel within the pores of the member.

With reference to the first mentioned method, the inorganic ion exchange gel, which is to fill the pores of the supportive member, is first separately formed by precipitating either an insoluble hydrous metal oxide or an acid salt from aqueous solution. The gel is then drawn or pressed into the pores of the supportive member. To a certain extent, the relative ease with which the gel may be forced into the pores of the supportive member is a function of the porosity of the member and the viscosity of the gel. However, I have found in each case, that the minimum pressure differential across the supportive member required to introduce a gel into the pores of the member is in the order of 14 to 15 p.s.i. In practice, pressures substantially above the minimum of 14 p.s.i. and up to 50,000 p.s.i. may be usefully employed.

As to the precipitation of an inorganic ion exchange gel within the pores of a supportive member, various methods of precipitation fall within the scope of my invention. For example, the pores of the supportive member may be saturated with a stabilized aqueous solution of a water soluble salt containing a metal from the previously defined group of elements and a hydroxide. The solution may be stabilized either by the use of urea as the hydroxide or by a chelating agent capable of holding multivalent metal ions in solution. After the supportive member is completely flooded, the stability of the solution is destroyed by heat to precipitate an insoluble hydrous metal oxide gel within the pores of the base member.

In the case of urea, heating to approximately 95° C. breaks down the urea to form a hydroxide of ammonia which then combines with the aqueous salt solution to precipitate the hydrous metal oxide gel. In this regard, I have found that any hydrous metal oxide which will precipitate from a weak basic solution will precipitate in the presence of urea upon heating. The metals forming insoluble hydrous metal oxide gels by precipitation from a solution including urea which are of greatest practical importance at the present time are: Al, Ga, Sc, La, Ac, Sn, Ti, Zr, Hf, Th, Bi, Cr (III), and Fe.

In the case of precipitation of a hydrous metal oxide or acid salt in the presence of a chelating agent, the metal cation of the soluble salt initially combines with the chelating agent to form a stable chelate. To destroy the stability of the chelate without boiling the solution, the aqueous solution preferably includes a reagent which upon heating attacks the chelate and thereby releases the metal cation into solution. The metal cation is then free to combine with the hydroxyl ion of the hydroxide to form the hydrous metal oxide precipitate. Any chelating agent which will break down either at temperatures below the boiling point of the aqueous solution or upon the attack of a heated reagent may be employed in my invention. To date, ethylenediaminetetraacetic (EDTA) acid or salts thereof have proven most satisfactory in that they readily break down when attacked by heated hydrogen peroxide.

Another method of precipitation encompassed by my invention involves the slow diffusion of reactants in aqueous solutions from opposite sides of a porous support member into the pores to precipitate either as a hydrous metal oxide or acid salt ion exchange gel. In general, I have found that for precipitation of hydrous metal oxides, the aqueous solutions separated by the porous support member may be a basic solution and a solution of a water-soluble salt of a metal selected from the foregoing groups III–VIII of the periodic table. In the general case, the metal cation of the salt and the hydroxyl ion of the base diffuse through the base member via the pores Within the pores the hydroxyl ion combines with the metal cation to precipitate the hydrous oxide gel of the metal which, in turn, fills the pores of the base member.

Although the foregoing is the general case, I have found that certain hydrous metal oxides are soluble in a base and will not generally precipitate even in weak basic solutions such as ammonium hydroxide. Such hydrous metal oxides may be termed acidic hydrous metal oxides and include hydrous oxides of the metals: Sb, Nb, Ta, Mo, V, U, and W. For precipitation of the acidic hydrous metal oxides, the aqueous solution separated by the porous base member may be an aqueous solution of a water soluble acid and an aqueous solution of a water soluble salt including an oxygenated metal anion wherein the metal is selected from a group consisting of: U. V, Sb, Nb, Ta, Mo, and W. In such instances, the acid and the oxygenated metal anion diffuse through the support member via the pores. Within the pores, the acid combines with the oxygenated anion and precipitates the hydrous metal oxide gel which, in turn, fills the pores of the base member.

In the case of acid salts, the aqueous solutions separated by the porous base member may be a solution of salt of a metal selected from the previously defined groups III through VIII of the periodic table and a solution including an oxygenated metal anion wherein the metal is selected from the group consisting of: P. Si, Ta, Sb, W, B, Nb, As, S, Se, Te, Po, U and Mo. In general, the oxygenated metal anion is the anion of a multivalent acid or a salt of the acid such as phosphoric acid, molybdic acid and tungstic acid.

Various examples of each of the above methods for each class of hydrous metal oxide and for the acid salt follow. In the following examples, approximate resistivity figures are given for each membrane. Although the method of measuring resistivity can vary depending upon the particular system in which the membrane is placed, in this case, resistivity is given after equilibration with water or with a 0.5 M solution of sodium chloride. Due to the high concentration of sodium chloride, the resistivity figures after salt equilibration are generally in the range of 30 to 100 ohm-cm., while the resistivity figures after water equilibration are substantially higher.

GROUP III

Example I

A hydrous gel of indium oxide was precipitated from an aqueous solution by adding 1.0 M sodium hydroxide to a 1.0 M solution of indium chloride. The hydrous gel was washed and separated from the aqueous solution by decantation and filtration. The pores of a flame-sprayed zirconia membrane having a thickness of 0.7 millimeter and a porosity of 31% were filled with the hydrous indium oxide gel by first flooding an upper surface of the membrane with the gel and then drawing the gel into the membrane by reducing the pressure below the membrane to approximately 10 microns.

The gel-filled membrane had an ion exchange capacity of 1.2 meq./gm., a resistivity after equilibration with 0.5 M sodium chloride at 25° C. of 45 ohm-cm. and a modulus of rupture of 4,200 p.s.i.

The unfilled membrane had a modulus of rupture of 4,900 p.s.i., a resistivity of $10^6$ ohm-cm., and no ion exchange capacity.

Example II

A hydrous gel of scandium oxide was precipitated from an aqueous solution by adding 1.0 M aqueous sodium hydroxide to a solution containing 1.0 M scandium chloride. The hydrous gel was washed and separated from the aqueous solution by decantation and filtration. Using the method of Example I, the hydrous gel was forced into the pores of a flame-sprayed zirconia membrane having a thickness of 0.8 millimeter and a porosity of 31%.

The filled membrane had an ion exchange capacity of 1.1 meq./gm., a resistivity after equilibration with 0.5 M sodium chloride at 25° C. of 47 ohm-cm., and a modulus of rupture of 4,350 p.s.i.

The unfilled membrane had a resistivity of $5 \times 10^6$ ohm-cm., a modulus of rupture of 5,000 p.s.i. and no ion exchange capacity.

Example III

The pores of a flame-sprayed zirconia membrane having a thickness of 0.9 millimeter and a porosity of 28% were flooded with an aqueous solution of 2.0 M aluminum nitrate containing 10% urea and the flooded membrane immersed in the solution for 24 hours and 100° C. At the end of this time, the pores of the membrane were filled with a hydrous gel of aluminum oxide.

The gel-filled membrane had an ion exchange capacity of 1.6 meq./gm., a resistivity after equilibration with distilled water at 25° C. of 250 ohm-cm., and a modulus of rupture of 5,300 p.s.i.

The unfilled membrane had a modulus of rupture of 6,000 p.s.i., a resistivity in distilled water of $9 \times 10^6$ ohm-cm., an no ion exchange capacity.

Example IV

The pores in a flame-sprayed zirconia membrane having a thickness of 0.7 millimeter and a porosity of 29% were flooded with an aqueous solution of 1.0 lanthanum chloride containing 10% urea and the flooded membrane immersed in the solution for 24 hours at 96° C. At the end of this time the pores of the membrane were filled with the hydrous gel of lanthanum oxide.

The gel-filled membrane had an ion exchange capacity of 1.2 meq./gm., a resistivity after equilibration with 0.5 M sodium chloride at 25° C. of 85 ohm-cm., and a modulus of rupture of 4,600 p.s.i.

The unfilled membrane had a modulus of rupture of 5,200 p.s.i., a resistivity of $10^6$ ohm-cm., and no ion exchange capacity.

Example V

The pores of a flame-sprayed zirconia membrane having a thickness of 0.8 M and a porosity of 35% were flooded with water. The flooded membrane was made the divider between two compartments one filled with a 1.0 M aluminum sulphate solution and the other with a 1.0 M ammonium hydroxide solution. Diffusion of the reagents into the membrane was allowed to continue for 24 hours. After removal from the diffusion apparatus, the pores of the membrane were filled with a hydrous gel of aluminum oxide.

The filled membrane had an ion exchange capacity of 2.3 meq./gm., a resistivity after equilibration of 25° C. with distilled water of 183 ohm-cm., and modulus of rupture of 4,500 p.s.i.

The unfilled membrane had a modulus of rupture of 4,700 p.s.i., a resistivity of $9 \times 10^5$ ohm-cm., and no ion exchange capacity.

Example VI

A flame-sprayed zirconia membrane having a thickness of 0.63 millimeter and a porosity of 33% was flooded with water. The flooded membrane was made the divider between two compartments one filled with a 2.0 M scandium nitrate solution and the other with a 6.0 M ammonium hydroxide solution. Diffusion of the reagents into the membrane was allowed to continue for 24 hours. After removal from the diffusion apparatus, the pores of the membrane were filled with a hydrous gel of scandium oxide.

Filled membrane had an ion exchange capacity of 1.2 meq./gm., a resistivity after equilibration with 0.5 sodium chloride at 25° C. of 35 ohm-cm., and a modulus of rupture of 4,100 p.s.i.

The unfilled membrane had a modulus of rupture of 4,900 p.s.i., a resistivity of $10^6$ ohm-cm., and no ion exchange capacity.

Example VII

A flame-sprayed zirconia membrane having a thickness of 0.7 millimeter and a porosity of 31% was flooded with an aqueous solution of 0.04 M aluminum sulphate and 1.0 M ammonium hydroxide containing 5% Versenol 120 (trade name for an EDTA type chelating agent manufactured by the Dow Chemical Corp.) and 5% hydrogen peroxide. The flooded membrane was immersed in the solution and held at 100° C. for 24 hours. At the end of this time, the pores of the membrane were filled with a hydrous gel of aluminum oxide.

The filled membrane had an ion exchange capacity of 1.4 meq./gm., a resistivity after equilibration with 0.5 M sodium chloride at 25° C. of 70 ohm-cm., a modulus of rupture of 4,200 p.s.i.

The unfilled membrane had a modulus of rupture of 4,700 p.s.i., a resistivity of $9 \times 10^5$ ohm-cm., and no ion exchange capacity.

Example VIII

A flame-sprayed zirconia membrane having a thickness of 0.9 millimeter and a porosity of 29% was flooded with an aqueous solution of 0.3 M scandium chloride and 1.0 M ammonium hydroxide containing 5% Versenol 120 and 5% hydrogen peroxide. The filled membrane was immersed in the solution and held at 100° C. for 24 hours. At the end of this time, the pores of the membrane were filled with a hydrous gel of scandium oxide.

The filled membrane had an ion exchange capacity of 1.25 meq./gm., a resistivity after equilibration of 188 ohm-cm., and a modulus of rupture of 4,700 p.s.i.

The unfilled membrane had a modulus of rupture of 5,300 p.s.i., a resistivity of $10^6$ ohm-cm., and no ion exchange capacity.

GROUP IV

Example IX

A hydrous gel of stannic oxide was precipitated by mixing 1.0 M stannic chloride at room temperature with an equal volume of 4.0 M $NaC_2H_3O_2$. The hydrous gel was washed and separated from the aqueous solution by decantation and filtration. The pores of a flame-sprayed zirconia membrane having a thickness of 0.72 millimeter and a porosity of 32% were filled with the hydrous stannic oxide gel by first flooding an upper surface of the membrane with the gel and by developing a pressure differential across the membrane of approximately 15 p.s.i.

The gel filled membrane had an ion exchange capacity of 1.4 meq./gm., a resistivity after equilibration with water at 25° C. of 810 ohm-cm., and a modulus of rupture of 4,000 p.s.i.

The unfilled membrane had a modulus of rupture of 5,000 p.s.i. a resistivity of $10^6$ ohm-cm., and no ion exchange capacity.

Example X

A hydrous gel of zirconium oxide was precipitated from an aqueous solution by adding 1.0 M sodium hydroxide at 60° C. to a 1.0 M zirconyl nitrate solution containing 1.0 M nitric acid until the pH rose to 6. The hydrous gel was washed and separated from the aqueous solution by decantation and filtration. The pores of the flame-sprayed zirconia membrane having a thickness of 0.81 millimeter and a porosity of 32% were filled with the hydrous zirconium oxide gel by first flooding an upper surface of the membrane with the gel and then drawing the gel into the membrane by reducing the pressure below the membrane to approximately 10 microns.

The gel-filled membrane had an ion exchange capacity of 1.5 meq./gm., a resistivity after equilibration with 0.5 M sodium chloride at 25° C. of 45 ohm-cm., and a modulus of rupture of 4,200 p.s.i.

The unfilled membrane had a modulus of rupture of 4,900 p.s.i., resistivity in water for $10^6$ ohm-cm., and no ion exchange capacity.

Example XI

The pores of a flame-sprayed zirconia membrane having a thickness of 0.9 millimeter and a porosity of 28% were flooded with an aqueous solution of 1.0 M stannic chloride containing 10% urea and the flooded membrane immersed in the solution for 24 hours at 100° C. At the end of this time the pores of the membrane were filled with a hydrous gel of stannic oxide.

The gel-filled membrane had an ion exchange capacity of 1.3 meq./gm., a resistivity after equilibration with water at 25° C. of 850 ohm-cm., and modulus of rupture of 4,500 p.s.i.

The unfilled membrane had a modulus of rupture of 5,200 p.s.i., the resistivity of $10^6$ ohm-cm., and no ion exchange capacity.

Example XII

The pores of a flame-sprayed zirconia membrane having a thickness of 0.75 millimeter and a porosity of 31% were flooded with an aqueous solution of 2.0 M zirconyl nitrate containing 10% urea. The flooded membrane was immersed in the solution for 24 hours at 97° C. At the end of this time, the pores of the membrane were filled with the hydrous gel of zirconium oxide.

The gel-filled membrane had an ion exchange capacity of 2.1 meq./gm., a resistivity after equilibration with 0.5 M sodium chloride at 25° C. of 50 ohm-cm., and a modulus of rupture of 4,800 p.s.i.

The unfilled membrane had a modulus of rupture of 5,200 p.s.i., a resistivity in water of $10^6$ ohm-cm., and no ion exchange capacity.

Example XIII

A flame-sprayed zirconia membrane having a thickness of 0.86 millimeter and a porosity of 35% were fllooded with water. The flooded membrane was made a divider between the two compartments, one filled with a water glass solution and the other with a 6.0 M solution of nitric acid. Diffusion of the reagents into the membrane was allowed to continue for 24 hours. After removal from the diffusion apparatus, the pores of the membrane were filled with a hydrous gel of silicon dioxide.

The gel-filled membrane had an ion exchange capacity of 1.3 meq./gm., a resistivity after equilibration with 0.5 M sodium chloride at 25° C. of 30 ohm-cm., and a modulus of rupture of 5,200 p.s.i.

The unfilled membrane had a modulus of rupture of 5,700 p.s.i., a resistivity of $8 \times 10^6$ ohm-cm., and no ion exchange capacity.

Example XIV

A flame-sprayed zirconia membrane having a thickness of 0.82 millimeter and a porosity of 27% was flooded with water. The flooded membrane was made the divider between two compartments, one filled with a 2.0 M zirconyl nitrate solution and the other with a 6.0 M ammonium hydroxide solution. Diffusion of the reagents into the membrane was allowed to continue for 24 hours. After removal from the diffusion apparatus, the pores of the membrane were filled with a hydrous gel of zirconium oxide.

The filled membrane had an ion exchange capacity of 1.5 meq./gm., a resistivity after equilibration with water at 25° C. of 300 ohm-cm., and a modulus of rupture of 4,600 p.s.i.

The unfilled membrane had a modulus of rupture of 5,200 p.s.i., a resistivity of $10^6$ ohm-cm., and no ion exchange capacity.

Example XV

A flame-sprayed zirconia membrane having a thickness of 0.91 millimeter and a porosity of 34% was flooded with an aqueous solution of 0.05 M zirconyl nitrate and 0.5 M ammonium hydroxide containing 5% Versenol 120 and 5% hydrogen peroxide. The filled membrane was immersed in the solution and held at 100° C. for 24 hours. At the end of this time, the pores of the membrane were filled with a hydrous gel of zirconium oxide.

The filled membrane had an ion exchange capacity of 2.25 meq./gm., a resistivity after equilibration with 0.5 M sodium chloride at 25° C. of 31 ohm-cm., and a modulus of rupture of 4,000 p.s.i.

The unfilled membrane had a modulus of rupture of 4,900 p.s.i., a resistivity of $5 \times 10^7$ ohm-cm., and no ion exchange capacity.

GROUP V

Example XVI

A hydrous gel of antimony pentoxide was precipitated from an aqueous solution by adding 1.0 M nitric acid to a 1.0 M solution of sodium antimonate until a pH of 2 was reached. The hydrous gel was washed and separated from the aqueous solution by decantation and filtration. The pores of a flame-sprayed zirconia membrane having a thickness of 0.81 millimeter and a porosity of 29% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.4 meq./gm., a resistivity after equilibration with distilled water at 25° C. of 900 ohm-cm., and a modulus of rupture of 5,600 p.s.i.

The unfilled membrane had a modulus of rupture of 5,900 p.s.i., a resistivity of $7.2 \times 10^6$ ohm-cm., and no ion exchange capacity.

Example XVII

A hydrous gel of niobic oxide was precipitated from an aqueous solution by adding 1.0 M nitric acid to a 1.0 M solution of sodium niobate until a pH of 2 was reached. The hydrous gel was washed and separated from the aqueous solution by decantation and filtration. The pores of a frame-sprayed zirconia membrane having a thickness of 0.83 millimeter and a porosity of 34% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.5 meq./gm., a resistivity after equilibration with 0.5 M sodium chloride at 25° C. of 32 ohm-cm., and a modulus of rupture of 4,100 p.s.i.

The unfilled membrane had a modulus of rupture of 4,900 p.s.i., a resistivity of $4 \times 10^6$ ohm-cm., and no ion exchange capacity.

Example XVIII

The pores in a flame-sprayed zirconia membrane having a thickness of 0.7 millimeter and a porosity of 29% were flooded with an aqueous solution of 1.0 M bismuth chloride containing 10% urea and the flooded membrane immersed in the solution for 24 hours at 100° C. At the end of this time the pores of the membrane were filled with the hydrous gel of bismuth oxide.

The gel-filled membrane had an ion exchange capacity of 1.3 meq./gm., a resistivity after equilibration with 0.5 M sodium chloride at 25° C. of 70 ohm-cm., and a modulus of rupture of 4,600 p.s.i.

The unfilled membrane had a modulus of rupture of 5,200 p.s.i., a resistivity of $10^6$ ohm-cm., and no ion exchange capacity.

Example XIX

A flame-sprayed zirconia membrane having a thickness of 0.71 millimeter and a porosity of 35% was flooded with water. The flooded membrane was made the divider between two compartments one filled with a 1.0 M bismuth chloride solution and the other with a 1.0 M ammonium hydroxide solution. Diffusion of the reagents into the membrane was allowed to continue for 24 hours. After removal from the diffusion apparatus, the pores of the membrane were filled with a hydrous gel of bismuth oxide.

The filled membrane had an ion exchange capacity of 2.2 meq./gm., a resistivity after equilibration with water at 25° C. of 580 ohm-cm., and a modulus of rupture of 4,300 p.s.i.

The unfilled membrane had a modulus of rupture of 5,100 p.s.i., a resistivity of $10^6$ ohm-cm., and no ion exchange capacity.

Example XX

A flame-sprayed zirconia membrane having a thickness of 0.7 millimeter and a porosity of 29% was flooded with water. The flooded membrane was made the divider between two compartments, one filled with 1.0 M antimony chloride solution and the other with a 1.0 M nitric acid solution. Diffusion of the reagents into the membrane was allowed to continue for 24 hours. After removal from the diffusion apparatus, the pores of the membrane were filled with a hydrous gel of antimony oxide.

The filled membrane had an ion exchange capacity of 1.0 meq./gm., a resistivity after equilibration with 0.5 sodium chloride at 25° C. of 75 ohm-cm., and a modulus of rupture of 5,300 p.s.i.

The unfilled membrane had a modulus of rupture of 5,700 p.s.i., a resistivity of $7 \times 10^6$ ohm-cm., and no ion exchange capacity.

GROUP VI

Example XXI

A hydrous gel of tungstic oxide was precipitated from an aqueous solution by adding hydrochloric acid to a 1.0 M solution of sodium tungstate until the pH fell to 1.5. The hydrous gel was washed and separated from the aqueous solution by decantation and filtration. The pores of a flame-sprayed zirconia membrane having a thickness of 0.65 millimeter and a porosity of 32% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.2 meq./gm., a resistivity after equilibration with 0.5 M sodium chloride at 25° C. of 42 ohm-cm., and a modulus of rupture of 4,900 p.s.i.

The unfilled membrane had a modulus of rupture of 5,200 p.s.i., a resistivity of $10^6$ ohm-cm., and no ion exchange capacity.

Example XXII

The pores in a flame-sprayed zirconia membrane having a thickness of 0.7 millimeter and a porosity of 29% were flooded with an aqueous solution of 1.0 M chromium chloride containing 10% urea and the flooded membrane immersed in the solution for 24 hours at 100° C. At the end of this time the pores of the membrane were filled with the hydrous gel of chromium oxide.

The gel-filled membrane had an ion exchange capacity of 1.0 meq./gm., a resistivity after equilibration with 0.5 M sodium chloride at 25° C. of 80 ohm-cm., and a modulus of rupture of 4,100 p.s.i.

The unfilled membrane had a modulus of rupture of 5,200 p.s.i., a resistivity of $10^6$ ohm-cm., and no ion exchange capacity.

Example XXIII

A flame-sprayed zirconia membrane having a thickness of 0.7 millimeter and a porosity of 31% was flooded with water. The flooded membrane was made the divider between two compartments, one filled with a 1.0 M sodium tungstate solution and the other with a 2.0 M hydrochloric acid solution. Diffusion of the reagents into the membrane was allowed to continue for 24 hours. After removal from the diffusion apparatus, the pores of the membrane were filled with a hydrous gel of tungstic oxide.

The filled membrane had an ion exchange capacity of 1.1 meq./gm., a resistivity after equilibration with 0.5 sodium chloride at 25° C. of 55 ohm-cm., and a modulus of rupture of 4,600 p.s.i.

The unfilled membrane had a modulus of rupture of 5,100 p.s.i. a resistivity of $10^6$ ohm-cm., and no ion exchange capacity.

GROUP VII

Example XXIV

A hydrous gel of manganese dioxide was precipitated from an aqueous solution by adding an 8% solution of manganous chloride to a solution of 2.0 M ammonium hydroxide and 1.0 M bromine. The hydrous gel was washed and separated from the aqueous solution by decantation and filtration. The pores of a flame-sprayed zirconia membrane having a thickness of 0.91 millimeter and a porosity of 34% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.8 meq./gm., a resistivity after equilibration with 0.5 M sodium chloride at 25° C. of 35 ohm-cm., and a modulus of rupture of 4.900 p.s.i.

The unfilled membrane had a modulus of rupture of 5,100 p.s.i., a resistivity of $2 \times 10^6$ ohm-cm., and no ion exchange capacity.

Example XXV

A flame-sprayed zirconia membrane having a thickness of 0.91 millimeter and a porosity of 34% was flooded with water. The flooded membrane was made the divider between two compartments, one filled with an 8% solution of manganous chloride and the other with a solution of 2.0 M ammonium hydroxide and 1.0 M bromine. Diffusion of the reagents into the membrane was allowed to continue for 24 hours. After removal from the diffusion apparatus, the pores of the membrane were filled with a hydrous gel of manganese dioxide.

The filled membrane had an ion exchange capacity of 1.8 meq./gm., a resistivity after equilibration with 0.5 M sodium chloride at 25° C. of 30 ohm-cm., and a modulus of rupture of 4,900 p.s.i.

The unfilled membrane had a modulus of rupture of 5,100 p.s.i., a resistivity of $2 \times 10^6$ ohm-cm., and no ion exchange capacity.

GROUP VIII

Example XXVI

A hydrous gel of ferric oxide was precipitated from an aqueous solution by adding 1.5 M ammonium hydroxide to a 0.5 M solution of ferric nitrate. The hydrous gel was washed and separated from the aqueous solution by decantation and filtration. The pores of a flame-sprayed zirconia membrane having a thickness of 0.81 millimeter and a porosity of 35% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.5 meq./gm., a resistivity after equilibration with water of 450 ohm-cm., and a modulus of rupture of 4,600 p.s.i.

The unfilled membrane had a modulus of rupture of 5,500 p.s.i., a resistivity of $10^6$ ohm-cm., and no ion exchange capacity.

Example XXVII

The pores in a flame-sprayed zirconia membrane having a thickness of 0.81 millimeter and a porosity of 34% were flooded with an aqueous solution of 2.0 M ferric nitrate containing 10% urea and the flooded membrane immersed in the solution for 18 hours at 100° C. At the end of this time the pores of the membrane were filled with the hydrous gel of ferric oxide.

The gel-filled membrane had an ion exchange capacity of 1.5 meq./gm., a resistivity after equilibration with water of 550 ohm-cm., and a modulus of rupture of 4,600 p.s.i.

The unfilled membrane had a modulus of rupture of 5,500 p.s.i., a resistivity of $10^6$ ohm-cm., and no ion exchange capacity.

Example XXVIII

A flame-sprayed zirconia membrane having a thickness of 0.81 millimeter and a porosity of 39% was flooded with water. The flooded membrane was made the divider between two compartments, one filled with a 0.5 M ferric nitrate solution and the other with a 1.5 M ammonium hydroxide solution. Diffusion of the reagents into the membrane was allowed to continue for 24 hours. After removal from the diffusion apparatus, the pores of the membrane were filled with a hydrous gel of ferric oxide.

The filled membrane had an ion exchange capacity of 1.6 meq./gm., a resistivity after equilibration with water of 650 ohm-cm., and a modulus of rupture of 4,500 p.s.i.

The unfilled membrane had a modulus of rupture of 5,300 p.s.i., a resistivity of $2 \times 10^6$ ohm-cm., and no ion exchange capacity.

Example XXIX

A flame-sprayed zirconia membrane having a thickness of 0.9 millimeter and a porosity of 29% was flooded with an aqueous solution of 0.5 M ferric nitrate and 1.5 M ammonium hydroxide containing 5% Versenol 120 and 5% hydrogen peroxide. The filled membrane was immersed in the solution and held at 100° C. for 24 hours. At the end of this time, the pores of the membrane were filled with a hydrous gel of ferric oxide.

The filled membrane had an ion exchange capacity of 1.1 meq./gm., a resistivity after equilibration 200 ohm-cm., and a modulus of rupture of 5,000 p.s.i.

LANTHANUM SERIES

Example XXX

A hydrous gel of ceric oxide was precipitated by mixing equal volumes of 1.0 M cerous chloride and 1.0 M $NH_4OH$ and aerating the mixture with oxygen for 24 hours. The pores of a flame-sprayed zirconia membrane having a thickness of 0.88 millimeter and a porosity of 31% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.0 meq./gm., a resistivity after equilibration with 0.5 M sodium chloride at 25° C. of 45 ohm-cm., and a modulus of rupture of 4,100 p.s.i.

The unfilled membrane had a modulus of rupture of 4,500 p.s.i., a resistivity of $7 \times 10^6$ ohm-cm., and no ion exchange capacity.

Example XXXI

A flame-sprayed zirconia membrane having a thickness of 0.71 millimeter and a porosity of 33% was flooded with water. The flooded membrane was made the divider between two compartments, one filled with a 1.0 cerium chloride solution and the other with a 1.0 M ammonium hydroxide solution. Diffusion of the reagents into the membrane was allowed to continue for 24 hours. After removal from the diffusion apparatus, the pores of the membrane were filled with a hydrous gel of ceric oxide.

The filled membrane had an ion exchange capacity of 1.1 meq./gm., a resistivity after equilibration with 0.5 sodium chloride at 25° C. of 40 ohm-cm., and a modulus of rupture of 4,000 p.s.i.

The unfilled membrane had a modulus of rupture of 4,400 p.s.i., a resistivity of $6 \times 10^6$ ohm-cm., and no ion exchange capacity.

Example XXXII

A flame-sprayed zirconia membrane having a thickness of 0.7 millimeter and a porosity of 29% was flooded with an aqueous solution of 1.0 M cerium chloride and 1.0 M ammonium hydroxide containing 5% Versenol 120 and 5% hydrogen peroxide. The filled membrane was immersed in the solution and held at 100° C. for 24 hours. At the end of this time, the pores of the membrane were filled with a hydrous gel of ceric oxide.

The filled membrane had an ion exchange capacity of 0.9 meq./gm., a resistivity after equilibration of 220 ohm-cm., and a modulus of rupture of 4,700 p.s.i.

The unfilled membrane had a modulus of rupture of 5,300 p.s.i., a resistivity of $8 \times 10^6$ ohm-cm., and no ion exchange capacity.

ACTINIDE SERIES

Example XXXIII

A hydrous gel of thorium oxide was precipitated from an aqueous solution by adding 1.0 M sodium hydroxide to a 1.0 M solution of thorium sulfate. The hydrous gel was washed and separated from the aqueous solution by decantation and filtration. The pores of a flame-sprayed zirconia membrane having a thickness of 0.9 millimeter and a porosity of 28% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.1 meq./gm., a resistivity after equilibration with 0.5 M sodium chloride at 25° C. of 85 ohm-cm., and a modulus of rupture of 4,200 p.s.i.

The unfilled membrane had a modulus of rupture of 4,900 p.s.i., a resistivity of $10^6$ ohm-cm., and no ion exchange capacity.

Example XXXIV

The pores in a flame-sprayed zirconia membrane having a thickness of 0.7 millimeter and a porosity of 29% were flooded with an aqueous solution of 1.0 M thorium sulfate containing 10% urea and the flooded membrane immersed in the solution for 24 hours at 96° C. At the end of this time the pores of the membrane were filled with the hydrous gel of thorium oxide.

The gel-filled membrane had an ion exchange capacity of 1.0 meq./gm., a resistivity after equilibration with 0.5 M sodium chloride at 25° C. of 80 ohm-cm., and a modulus of rupture of 4,600 p.s.i.

The unfilled membrane had a modulus of rupture of 5,200 p.s.i., a resistivity of $10^6$ ohm-cm., and no ion exchange capacity.

Example XXXV

A flame-sprayed zirconia membrane having a thickness of 0.9 millimeter and a porosity of 28% was flooded with water. The flooded membrane was made the divider between two compartments one filled with a 1.0 M thorium sulfate solution and the other with a 1.0 M ammonium hydroxide solution. Diffusion of the reagents into the membrane was allowed to continue for 24 hours. After removal from the diffusion apparatus, the pores of the membrane were filled with a hydrous gel of thorium oxide.

The filled membrane had an ion exchange capacity of 1.1 meq./gm., a resistivity after equilibration with 0.5 sodium chloride at 25° C. of 85 ohm-cm., and a modulus of rupture of 4,200 p.s.i.

The unfilled membrane had a modulus of rupture of 4,900 p.s.i., a resistivity of $10^6$ ohm-cm., and no ion exchange capacity.

ACID SALTS

Example XXXVI

A hydrous acid salt gel of zirconyl phosphate was precipitated from an aqueous solution by adding phosphoric acid to a 1.0 M solution of zirconyl nitrate containing 1.0 M nitric acid. The hydrous gel was washed and separated from the aqueous solution by decantation and filtration. The pores of a flame-sprayed zirconia membrane having a thickness of 0.72 millimeter and a porosity of 29% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.2 meq./gm., a resistivity after equilibration with 0.5 M sodium chloride at 25° C. of 75 ohm-cm., and a modulus of rupture of 5,500 p.s.i.

The unfilled membrane had a modulus of rupture of 5,900 p.s.i., a resistivity of $10^6$ ohm-cm., and no ion exchange capacity.

Example XXXVII

A flame-sprayed zirconia membrane having a thickness of 0.73 millimeter and a porosity of 30% was flooded with 1.0 M nitric acid. The flooded membrane was made the divider between two compartments, one filled with a 1.0 M zirconyl nitrate solution containing 1.0 M nitric acid and the other with an aqueous solution phosphoric acid. Diffusion of the reagents into the membrane was allowed to continue for 24 hours. After removal from the diffusion apparatus, the pores of the membrane were filled with acid salt gel of zirconyl phosphate.

The filled membrane had an ion exchange capacity of 1.25 meq./gm., a resistivity after equilibration with 0.5 sodium chloride at 25° C. of 43 ohm-cm., and a modulus of rupture of 5,400 p.s.i.

The unfilled membrane had a modulus of rupture of 5,800 p.s.i., a resistivity of $10^6$ ohm-cm., and no ion exchange capacity.

Example XXXVIII

An acid salt gel of zirconium silicate was precipitated from an aqueous solution by adding 100 ml. of a 25% zirconyl chloride solution to 200 ml. of a 20% water glass solution. The hydrous gel was washed and separated from the aqueous solution by decantation and filtration. The pores of a flame-sprayed zirconia membrane having a thickness of 0.77 millimeter and a porosity of 29% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.0 meq./gm., a resistivity after equilibration with water at 25° C. of 400 ohm-cm., and a modulus of rupture of 4,800 p.s.i.

The unfilled membrane had a modulus of rupture of 5,700 p.s.i., a resistivity of $5 \times 10^6$ ohm-cm., and no ion exchange capacity.

Example XXXIX

A flame-sprayed zirconia membrane having a thickness of 0.81 millimeter and a porosity of 31% was flooded with nitric acid. The flooded membrane was made the divider between two compartments, one filled with a 1.0 M sodium hexatantalate solution and the other with a 1.0 M zirconyl nitrate solution containing 1.0 M nitric acid. Diffusion of the reagents into the membrane was allowed to continue for 24 hours. After removal from the diffusion apparatus, the pores of the membrane were filled with an acid gel of zirconium tantalate.

The filled membrane had an ion exchange capacity of 1.2 meq./gm., a resistivity after equilibration with 0.5 M sodium chloride at 25° C. of 45 ohm-cm., and a modulus of rupture of 4,700 p.s.i.

The unfilled membrane had a modulus of rupture of 5,500 p.s.i., a resistivity of $2 \times 10^6$ ohm-cm., and no ion exchange capacity.

Example XL

An acid salt gel of zirconium tantalate was precipitated from an aqueous solution by adding 1.0 M sodium hexatantalate to a 1.0 M solution of zirconyl nitrate containing 1.0 M nitric acid until the pH rose to 4. The gel was washed and separated from the aqueous solution by decantation and filtration. The pores of a flame-sprayed zirconia membrane having a thickness of 0.81 millimeter and a porosity of 31% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.2 meq./gm., a resistivity after equilibration with 0.5 M sodium chloride at 25° C. of 50 ohm-cm., and a modulus of rupture of 4,700 p.s.i.

The unfilled membrane had a modulus of rupture of 5,500 p.s.i., a resistivity of $2 \times 10^6$ ohm-cm., and no ion exchange capacity.

Example XLI

An acid salt gel of zirconium antimonate was precipitated from an aqueous solution by combining 500 ml. of 0.5 M potassium antimonate at 90° C. with 250 ml. of 0.5 M zirconyl nitrate. The gel was washed and separated from the aqueous solution by decantation and filtration. The pores of a flame-sprayed zirconia membrane having a thickness of 0.69 millimeter and a porosity of 30% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.3 meq./gm., a resistivity after equilibration with 0.5

M sodium chloride at 25° C. of 50 ohm-cm., and a modulus of rupture of 4,200 p.s.i.

The unfilled membrane had a modulus of rupture of 5,100 p.s.i., a resistivity of $7 \times 10^6$ ohm-cm., and no ion exchange capacity.

Example XLII

A flame-sprayed zirconia membrane having a thickness of 0.63 millimeter and a porosity of 30% was flooded membrane was made the divider between two compartments, one filled with a 2.0 M zirconyl nitrate, 2.0 M nitric acid solution and the other with a 2.0 M sodium tungstate solution. Diffusion of the reagents into the membrane was allowed to continue for 24 hours. After removal from the diffusion apparatus, the pores of the membrane were filled with a gel of zirconium tungstate.

The filled membrane had an ion exchange capacity of 1.8 meq./gm., a resistivity after equilibration with 0.5 M sodium chloride at 25° C. of 50 ohm-cm., and a modulus of rupture of 4,100 p.s.i.

The unfilled membrane had a modulus of rupture of 4,800 p.s.i., a resistivity of $10^6$ ohm-cm., and no ion exchange capacity.

Example XLIII

An acid salt gel of zirconium tungstate was precipitated from an aqueous solution by adding 2.0 M sodium tungstate to a 2.0 M solution of zirconyl nitrate containing 2.0 M nitric acid. The gel was washed and separated from the aqueous solution by decantation and filtration. The pores of a flame-sprayed zirconia membrane having a thickness of 0.63 millimeter and a porosity of 32% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.9 meq./gm., a resistivity after equilibration with 0.5 M sodium chloride at 25° C. of 198 ohm-cm., and a modulus of rupture of 4,100 p.s.i The unfilled membrane had a modulus of rupture of 4,800 p.s.i., a resistivity of $10^6$ ohm-cm., and no ion exchange capacity.

Example XLIV

A flame-sprayed zirconia membrane having a thickness of 0.63 millimeter and a porosity of 30% was flooded with water. The flooded membrane was made the divider between two compartments, one filled with a 1.0 M sodium borate solution and the other with a 1.0 M zirconyl nitrate solution. Diffusion of the reagents into the membrane was allowed to continue for 24 hours. After removal from the diffusion apparatus, the pores of the membrane were filled with a gel of zirconium borate.

The filled membrane had an ion exchange capacity of 1.2 meq./gm., a resistivity after equilibration with water at 25° C. of 490 ohm-cm., and a modulus of rupture of 3,500 p.s.i.

The unfilled membrane had a modulus of rupture of 4,400 p.s.i., a resistivity of $4 \times 10^6$ ohm-cm., and no ion exchange capacity.

Example XLV

An acid salt gel of zirconium borate was precipitated from an aqueous solution by adding 1.0 M sodium borate to a 1.0 M solution of zirconyl nitrate. The gel was washed and separated from the aqueous solution by decantation and filtration. The pores of a flame-sprayed zirconia membrane having a thickness of 0.7 millimeter and a porosity of 33% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.4 meq./gm., a resistivity after equilibration with water at 25° C. of 1,800 ohm-cm., and a modulus of rupture of 3,300 p.s.i.

The unfilled membrane had a modulus of rupture of 4,200 p.s.i., a resistivity of $4 \times 10^6$ ohm-cm., and no ion exchange capacity.

Example XLVI

A flame-sprayed zirconia membrane having a thickness of 0.8 millimeter and a porosity of 33% was flooded with water. The flooded membrane was made the divider between two compartments, one filled with a 1.0 M scandium chloride solution containing 0.5 nitric acid and the other with a 1.0 M sodium niobate solution. Diffusion of the reagents into the membrane was allowed to continue for 24 hours. After removal from the diffusion apparatus, the pores of the membrane were filled with a gel of scandium niobate.

The filled membrane had an ion exchange capacity of 1.8 meq./gm., a resistivity after equilibration with water at 25° C. of 250 ohm-cm., and a modulus of rupture of 4,300 p.s.i.

The unfilled membrane had a modulus of rupture of 5,000 p.s.i., a resistivity of $7 \times 10^6$ ohm-cm., and no ion exchange capacity.

Example XLVII

An acid salt gel of scandium niobate was precipitated from an aqueous solution by adding 1.0 M sodium niobate to a 1.0 M solution of scandium chloride containing 0.5 M nitric acid. The gel was washed and separated from the aqueous solution by decantation and filtration. The pores of a flame-sprayed zirconia membrane having a thickness of 0.8 millimeter and a porosity of 31% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.5 meq./gm., a resistivity after equilibration with water at 25° C. of 550 ohm-cm., and a modulus of rupture of 4,350 p.s.i.

The unfilled membrane had a modulus of rupture of 5,100 p.s.i., a resistivity of $7 \times 10^6$ ohm-cm., and no ion exchange capacity.

Example XLVIII

A flame-sprayed zirconia membrane having a thickness of 0.63 millimeter and a porosity of 33% was flooded with water. The flooded membrane was made the divider between two compartments, one filled with a 2.0 M sodium tungstate solution and the other with a 1.0 M chromium nitrate solution containing 1.0 M nitric acid. Diffusion of the reagents into the membrane was allowed to continue for 24 hours. After removal from the diffusion apparatus, the pores of the membrane were filled with a gel of chromium tungstate.

The filled membrane had an ion exchange capacity of 1.9 meq./gm., a resistivity after equilibration of 303 ohm-cm., and a modulus of rupture of 3,700 p.s.i.

The unfilled membrane had a modulus of rupture of 4,400 p.s.i., a resistivity of $8 \times 10^6$ ohm-cm., and no ion exchange capacity.

Example XLIX

An acid salt gel of chromium tungstate was precipitated from an aqueous solution by adding 2.0 M sodium tungstate to a 1.0 M solution of chromium nitrate containing 1.0 M nitric acid until the pH rose to 7. The gel was washed and separated from the aqueous solution by decantation and filtration. The pores of a flame-sprayed zirconia membrane having a thickness of 0.7 millimeter and a porosity of 31% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.4 meq./gm., a resistivity after equilibration of 201 ohm-cm., and a modulus of rupture of 3,400 p.s.i.

The unfilled membrane had a modulus of rupture of 3,900 p.s.i., a resistivity of $8 \times 10^6$ ohm-cm., and no ion exchange capacity.

Example L

A flame-sprayed zirconia membrane having a thickness of 0.73 millimeter and a porosity of 36% was flooded with water. The flood membrane was made the divider between two compartments, one filled with a 2.0 M sodium niobate solution and the other with a 1.0 M ferric nitrate solution containing 1.0 M nitric acid. Diffusion of the reagents into the membrane was allowed to continue for 24 hours. After removal from the diffusion apparatus, the pores of the membrane were filled with a gel of ferric niobate.

The filled membrane had an ion exchange capacity of 1.8 meq./gm., a resistivity after equilibration of 403 ohm-cm., and a modulus of rupture of 4,600 p.s.i.

The unfilled membrane had a modulus of rupture of 5,200 p.s.i., a resistivity of $9 \times 10^6$ ohm-cm., and no ion exchange capacity.

Example LI

An acid salt gel of ferric niobate was precipitated from an aqueous solution by adding 2.0 M sodium niobate to a 1.0 M solution of ferric nitrate containing 1.0 M nitric acid until a pH of 7 was reached. The gel was washed and separated from the aqueous solution by decantation and filtration. The pores of a flame-sprayed zirconia membrane having a thickness of 0.75 millimeter and a porosity of 38% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.9 meq./gm., a resistivity after equilibration of 305 ohm-cm., and a modulus of rupture of 3,100 p.s.i.

Example LII

A flame-sprayed zirconia membrane having a thickness of 0.83 millimeter and a porosity of 39% was flooded with water. The flooded membrane was made the divider between two compartments, one filled with a 2.0 M sodium tantalate solution and the other with a 1.0 M aluminum nitrate solution containing 0.5 M nitric acid. Diffusion of the reagents into the membrane was allowed to continue for 24 hours. After removal from the diffusion apparatus, the pores of the membrane were filled with a gel of aluminum tantalate.

The filled membrane had an ion exchange capacity of 2.0 meq./gm., a resistivity after equilibration of 213 ohm-cm., and a modulus of rupture of 4,300 p.s.i.

The unfilled membrane had a modulus of rupture of 5,000 p.s.i., a resistivity of $3 \times 10^6$ ohm-cm., and no ion exchange capacity.

Example LIII

An acid salt gel of aluminum tantalate was precipitated from an aqueous solution by adding 2.0 M sodium tantalate to a 1.0 M solution of aluminum nitrate containing 0.5 M nitric acid until the pH of 6 was reached. The gel was washed and separated from the aqueous solution by decantation and filtration. The pores of a flame-sprayed zirconia membrane having a thickness of 0.9 millimeter and a porosity of 43% were filled with the acid salt gel by first flooding an upper surface of the membrane with the gel and then drawing the gel into the membrane by reducing the pressure below the membrane to approximately 10 microns.

The gel-filled membrane had an ion exchange capacity of 2.3 meq./gm., a resistivity after equilibration of 147 ohm-cm., and a modulus of rupture of 2,900 p.s.i.

The unfilled membrane had a modulus of rupture of 3,700 p.s.i., a resistivity of $4 \times 10^6$ ohm-cm., and no ion exchange capacity.

Example LIV

A flame-sprayed zirconia membrane having a thickness of 0.73 millimeter and a porosity of 35% was flooded with water. The flooded membrane was made the divider between two compartments one filled with a 2.0 M sodium niobate solution containing 1 M sodium hydrochlorite and the other with a 1.0 M cerium nitrate solution containing 0.5 nitric acid. Diffusion of the reagents into the membrane was allowed to continue for 24 hours. After removal from the diffusion apparatus, the pores of the membrane were filled with a gel of cerium niobate.

The filled membrane had an ion exchange capacity of 1.8 meq./gm., a resistivity after equilibration of 305 ohm-cm., and a modulus of rupture of 3,200 p.s.i.

The unfilled membrane had a modulus of rupture of 4,000 p.s.i., a resistivity of $7 \times 10^6$ ohm-cm., and no ion exchange capacity.

Example LV

An acid salt gel of cerium niobate was precipitated from an aqueous solution by adding 2.0 M sodium niobate to a 1.0 M solution of cerium nitrate containing 0.5 M nitric acid until a pH of 7 was reached. The solution was aereated to complete oxidation of the cerium. The gel was washed and separated from the aqueous solution by decantation and filtration. The pores of a flame-sprayed zirconia membrane having a thickness of 0.76 millimeter and a porosity of 30% were filled with the acid salt gel by first flooding an upper surface of the membrane by reducing the pressure below the membrane to approximately 10 microns.

The gel-filled membrane had an ion exchange capacity of 1.4 meq./gm., a resistivity after equilibration of 350 ohm-cm., and a modulus of rupture of 3,800 p.s.i.

The unfilled membrane had a modulus of rupture of 4,100 p.s.i., a resistivity of $8 \times 10^6$ ohm-cm., and no ion exchange capacity.

Example LVI

A flame-sprayed zirconia membrane having a thickness of 0.91 millimeter and a porosity of 46% was flooded with water. The flooded membrane was made the divider between two compartments, one filled with a 1.0 M thorium sulfate solution and the other with a 1.0 M phosphoric acid solution. Diffusion of the reagents into the membrane was allowed to continue for 24 hours. After removal from the diffusion apparatus, the pores of the membrane were filled with a gel of thorium phosphate.

The membrane had an ion exchange capacity of 2.4 meq./gm., a resistivity after equilibration of 205 ohm-cm., and a modulus of rupture of 3,250 p.s.i.

The unfilled membrane had a modulus of rupture of 3,700 p.s.i., a resistivity of $1.5 \times 10^6$ ohm-cm., and no ion exchange capacity.

Example LVII

An acid salt gel of thorium phosphate was precipitated from an aqueous solution by adding 1.0 M thorium sulphate to a 1.0 M solution of phosphoric acid. The gel was washed and separated from the aqueous solution by decantation and filtration. The pores of a flame-sprayed zirconia membrane having a thickness of 0.7 millimeter and a porosity of 28% were filled with the acid salt gel by first flooding an upper surface of the membrane with the gel and then drawing the gel into the membrane by reducing the pressure below the membrane to approximately 10 microns.

The gel-filled membrane had an ion exchange capacity of 1.3 meq./gm., a resistivity after equilibration of 265 ohm-cm., and a modulus of rupture of 3,800 p.s.i.

The unfilled membrane had a modulus or rupture of 4,300 p.s.i., a resistivity of $3 \times 10^6$ ohm-cm., and no ion exchange capacity.

Figure 1:
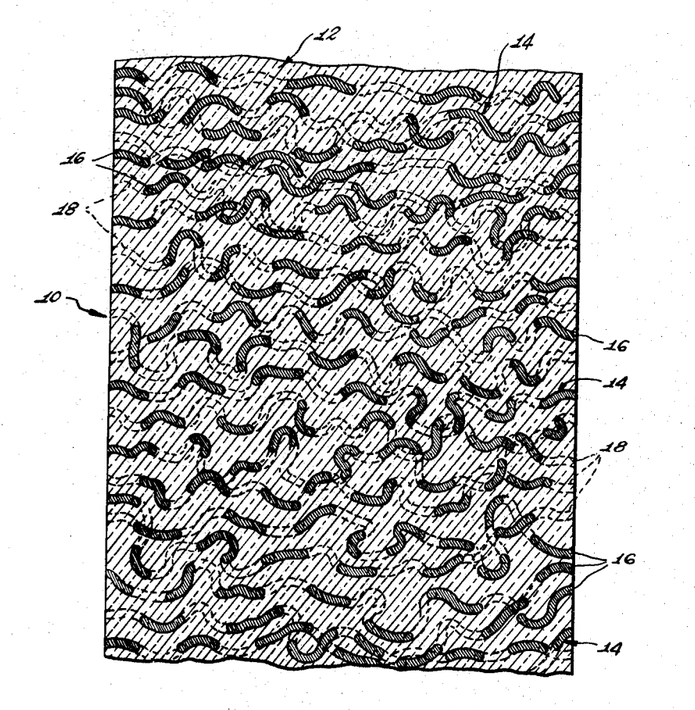

In each of the foregoing examples the resulting membrane is substantially the same. The accompanying drawing is a magnified cross-sectional representation of such a membrane. In the drawing, the membrane is represented generally by the numeral 10 and includes a strong, rigid core structure 12 perforated by a plurality of interconnecting pores 14 extending between the left and right hand surfaces of the membrane. The darkened solid channel portions 16 of the pores 14 represent the ion exchange gel in the plane of the drawing. The dotted line portions 18 joining the gels 16 represent continuations of the gels in the pores, the result being a membrane having a plurality of gel-filled interconnecting pores.

As previously indicated, the gels filling the pores of the membrane give rise to the membrane's ion exchange capacity while the inner-core structure provides its high strength. This combination results in a permselective membrane which is particularly useful in fuel cells and in batteries where an extremely strong ion selective membrane is required to maintain ion separation between the electrodes of the battery or fuel cell and wherein operating temperatures may approach and exceed 125° C.

While various specific methods of manufacturing strong porous membranes incorporating ion exchange gels of insoluble hydrous metal oxides and acid salts have been disclosed, they are merely illustrative of my invention which is to be limited in scope only by the following claims.

I claim:

1. A strong permselective membrane, comprising:
    a strong, rigid, substantially insoluble, inert plate-like matrix having interconnecting pores between opposing surfaces; and
    a gel of an insoluble hydrous metal oxide in said interconnecting pores.

2. The permselective membrane of claim 1 wherein the metallic element of said hydrous metal oxide falls within Group III through Group VIII of the Periodic Table of Elements.

3. The permselective membrane of claim 1 wherein the metallic element of said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce and Yb.

4. A method of making an extremely strong water-insoluble membrane incorporating inorganic permselective materials, comprising the steps of:
    forming an insoluble gel of an inorganic ion exchange material selected from the group consisting of an insoluble hydrous metal oxide and an insoluble acid salt;
    contacting a surface of a strong, water-insoluble inert plate member with said gel, said plate member having an inner structure of interconnecting pores between opposing surfaces;
    and creating a pressure differential across said plate member whereby said gel is forced into said plate member to fill said interconnecting pores.

5. A method of making an extremely strong, water-insoluble membrane incorporating inorganic permselective materials comprising the steps of:
    immersing a strong, water-insoluble inert plate member having an inner structure of interconnecting pores between opposing faces in a stabilized aqueous solution containing a soluble salt of a metal selected from Group III through Group VIII of the Periodic Table of Elements and a water soluble hydroxide;
    and heating said aqueous solution to precipitate a gel of an insoluble hydrous metal oxide in said interconnecting pores.

6. A method of making an extremely strong, water-insoluble membrane incorporating inorganic permeselective materials, comprising the steps of:
    immersing a strong, water-insoluble inert plate member having an inner structure of interconnecting pores between opposing surfaces in an aqueous solution containing a soluble salt of a metal selected from Group III through Group VIII of the Periodic Table of Elements and urea;
    and heating said aqueous solution to a temperature below the boiling point of said solution to precipitate a gel of an insoluble hydrous metal oxide in said interconnecting pores.

7. A method of making an extremely strong, water-insoluble membrane incorporating inorganic permselective materials, comprising the steps of:
    immersing a strong, water-insoluble inert plate member having an inner structure of interconnecting pores between opposing surfaces in an aqueous solution containing a soluble salt of a metal selected from the group consisting of Al, Ga, Sc, La, Ac, Sn, Ti, Zr, Hf, Th, Bi, Cr (III), and Fe and urea;
    and heating said aqueous solution to a temperature above 95° C. to precipitate a gel of an insoluble hydrous metal oxide an said interconnecting pores.

8. A method of making an extremely strong, water-insoluble membrane incorporating inorganic permselective materials, comprising steps of:
    immersing a strong water-insoluble inert plate member having an inner structure of interconnecting pores between opposing surfaces in an aqueous solution containing a soluble salt with a metal selected from Group III through Group VIII of the Periodic Table of Elements, a water-soluble hydroxide, and a chelating agent for holding the metal of said salt to form a metal chelate;
    and heating said aqueous solution to break down said metal chelate and to precipitate a gel of an insoluble hydrous metal oxide in said interconnecting pores.

9. The method of claim 8 wherein said chelating agent is of the EDTA type.

10. The method of claim 8 wherein said aqueous solution includes a chelate destroying reagent.

11. A method of making an extremely strong, water-insoluble membrane incorporating inorganic permselective materials, comprising the steps of:
    immersing a strong, water-insoluble inert plate member having an inner structure of interconnecting pores between opposing surfaces in an aqueous solution containing a soluble salt of a metal selected from group III through Group VIII of the Periodic Table of Elements, a water-soluble hydroxide, a chelating agent of the EDTA type, and hydrogen peroxide;
    and heating said aqueous solution to a temperature below the boiling point of said solution to precipitate a gel of an insoluble hydrous metal oxide in said interconnecting pores.

12. A method of making an extremely strong, water-insoluble membrane incorporating inorganic permselective materials, comprising the step of:
    diffusing first and second aqueous solutions into opposite surfaces of the strong, rigid, water insoluble, inert plate member having an inner structure of interconnecting pores between opposing surfaces to precipitate an insoluble gel of an inorganic ion exchange material selected from the group consisting of an insoluble hydrous metal oxide and an insoluble acid salt within said interconnecting pores.

13. The method of claim 12 wherein said first aqueous solution contains a soluble salt of a metal selected from Group III through Group VIII of the Periodic Table of Elements and wherein said second solution contains a soluble hydroxide.

14. The method of claim 12 wherein said first solution contains a water soluble acid and wherein said second solution contains a water soluble salt having an oxygenated anion of a metal selected from the group consisting of Sb, Nb, Ta, Mo, V, U and W.

15. The method of claim 12 wherein said first solution contains a water-soluble salt of a metal selected from Group III through Group VIII of the Periodic Table of Elements and wherein said second solution contains an oxygenated anion of a metal selected from a group consisting of P, Si, Ta, Sb, W, B, Nb, Mo, As, S, Se, Te, Po, and V.

16. The method of claim 12 wherein said first solution contains a water-soluble salt of a metal selected from Group III through Group VIII of the Periodic Table of Elements and wherein said second solution contains a water-soluble multivalent acid.

References Cited

UNITED STATES PATENTS

| | | | |
|---|---|---|---|
| 483,692 | 10/1892 | Lehman | 136—142 |
| 2,913,511 | 11/1959 | Grubb | 136—86 |
| 3,056,647 | 10/1962 | Amphlett | 136—153 |
| 3,147,149 | 9/1964 | Postal | 136—153 X |
| 3,152,061 | 10/1964 | Nishihara | 204—296 |
| 3,174,881 | 3/1965 | McEvoy et al. | 136—142 X |
| 3,186,875 | 6/1965 | Freeman | 136—153 |
| 3,234,031 | 2/1966 | Zirngiebl et al. | 117—130 |
| 3,257,215 | 6/1966 | Schneble et al. | 117—130 |
| 3,266,940 | 8/1966 | Caesar | 136—86 |
| 3,276,910 | 10/1966 | Grasselli et al. | 136—86 |

OTHER REFERENCES

Amphlett et al.: Synthetic Inorganic Ion-Exchange Materials, J. Inorg. Nucl. Chem., 1958, vol. 6, pp. 220 and 236, Pergamon Press Lt., London.

WINSTON A DOUGLAS, Primary Examiner

D. L. WALTON, Assistant Examiner

U.S. Cl. X.R.

136—158; 204—301, 295; 210—22, 502, 510